United States Patent Office 3,817,807
Patented June 18, 1974

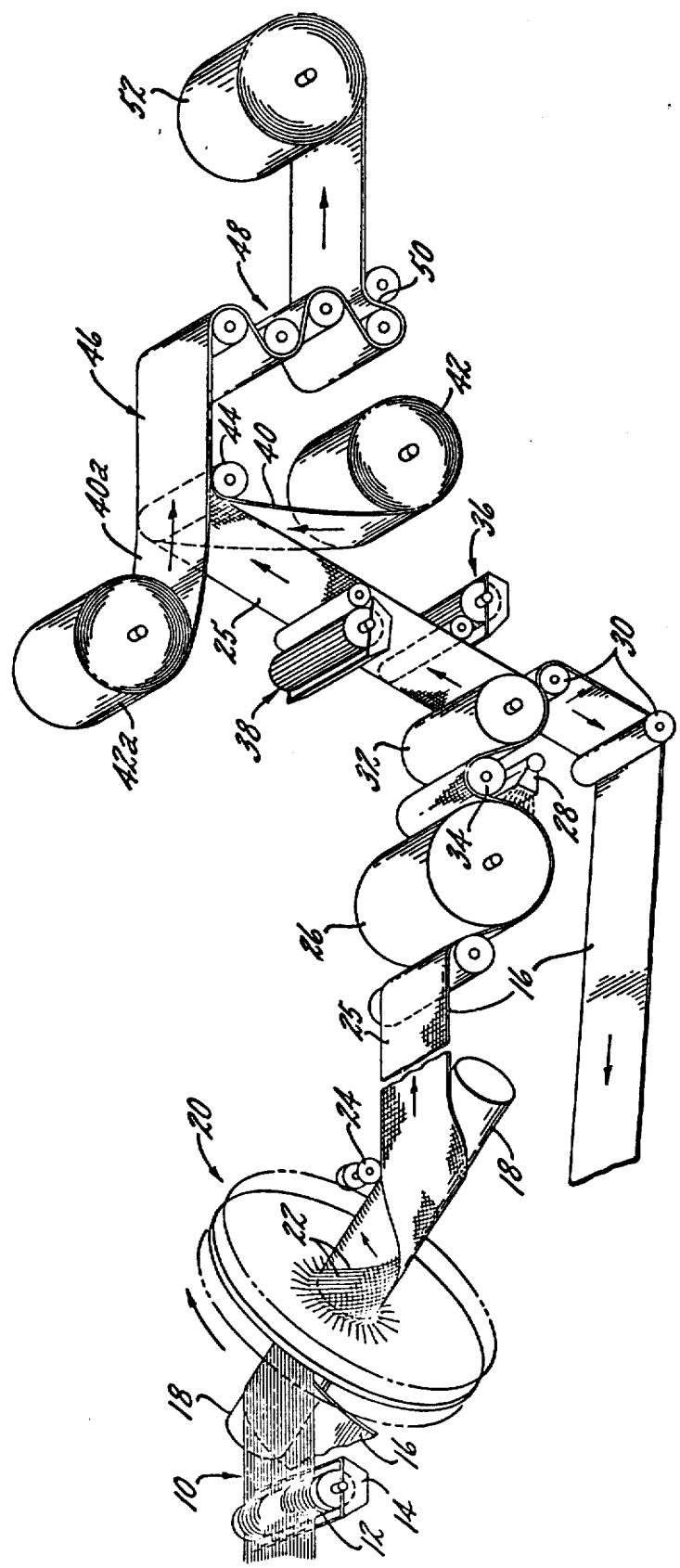

3,817,807
PROCESS FOR MAKING NONWOVEN SCRIMS
Ralph V. Braun and Jerome L. Schwoerer, Neenah, Wis., assignors to Kimberly-Clark Corporation, Neenah, Wis.
Filed Apr. 7, 1972, Ser. No. 242,104
Int. Cl. D04h 3/12
U.S. Cl. 156—181                6 Claims

ABSTRACT OF THE DISCLOSURE

A process for forming nonwoven scrims in which an adhesively bonded scrim positioned on a carrier belt is brought into contact with an arcuate, release surface heated to a temperature generally in the range of 200° F. to 400° F. and separating the carrier and scrim from the surface after the adhesive has reached its elastomeric point. Separation without significant buildup is achieved by incorporating into the adhesive a minor amount of a selected release agent such as mineral oil, a paraffin wax emulsion, oleic acid and dioctyl phthalate.

RELATED APPLICATION

Schwoerer, Ser. No. 34,367, filed May 4, 1970, for Process for Forming Nonwoven Scrims, now abandoned.

This invention relates to processes for forming nonwoven materials and, more particularly, to processes for forming nonwoven scrim materials efficiently and at high speeds.

In recent years, nonwoven materials have come into widespread use for various applications, particularly where the product may be disposed of after only one or a few uses. Nonwoven materials can provide the desired features such as softness, feel and other aesthetics as well as strength at a cost less than woven or other materials.

One of the nonwoven materials that may be advantageously employed is a nonwoven scrim which comprises a set of spaced warp threads which extend in the longitudinal or machine direction, and a set of spaced fill threads which extend across the warp threads in the cross or transverse direction. The two sets of threads are thus dispersed in a face-to-face relation to each other and are adhesively bonded together where the threads of one set cross the threads of the other set. The scrim materials provide a low cost reinforcing layer that may be combined with cellulosic wadding, tissue, fiber applique or other layers to form a variety of laminated products.

Several methods are known for forming such materials, one such process and apparatus being illustrated in U.S. Pat. 2,841,202 to Hirschy. In this method, as well as in other similar methods, the fill threads are laid across the machine direction or warp threads in a continuous fashion during formation. The warp threads are generally coated with an adhesive and are then carried through the apparatus on a heated belt formed from a material such as silicone rubber. The heated belt causes the adhesive on the warp threads to develop sufficient tack to adhere the fill threads to the warp threads when they are placed in contact.

Typically, the formed scrim is then separated from the carrier belt by heating the scrim adhesive to a point where the adhesive will release from the belt without disrupting the scrim. This is almost universally accomplished by passing the scrim through a hot box or oven maintained at a temperature in the range of from about 200° F. to about 350° F., depending upon the particular adhesive that was applied to the warp threads. However, since commercial apparatus for forming the scrim can operate at speeds up to 700 feet per minute or even up to 1300 feet per minute or more, economics dictate that the oven or the like be somewhat limited in size. Accordingly, to obtain the necessary residence time for effecting separation of the scrim from the belt and curing of the adhesive, it is necessary to force the scrim to traverse a tortuous path generally involving a series of sharp turns and bends over variously positioned stationary mandrels.

While adequate residence time is achieved by forcing the scrim through such a tortuous path, this is accompanied by a variety of undesirable effects. The sharp bends and turns involved tend to move the fill threads in relation to the warp threads so as to adversely effect the uniformity of appearance of the scrim. This is so even though the belt side of the scrim-belt combination is in contact with the stationary mandrels. Having the scrim side in contact with the mandrels would, of course, totally disrupt the scrim. Additionally, the bonds formed between the threads are often weakened and even broken, unless exceptionally large amounts of adhesive are employed. These effects are particularly acute when the scrim is formed of a low stretch material such as glass which is not sufficiently yieldable to accommodate the turns and bends. The useful life of the belt, typically having a silicone rubber surface, is also significantly diminished due to the severe bends and turns through which it must pass.

These problems are further heightened with the employment of adhesives that necessitate a high cure or release temperature, i.e. about 300° F. to about 350° F. The type of adhesives that have therefore been employed to coat the warp threads have generally been those having an organic solvent such as acetone because of the relative ease with which the solvent can be flashed off in curing. The employment of adhesives that provide the scrim with a softer feel, such as plastisols and latex adhesives, has been limited.

The copending Schwoerer application, Ser. No. 34,367, filed May 4, 1970 and assigned to the assignee of the present invention, discloses an advantageous method for forming such nonwoven scrims which obviates the necessity of passing the scrim through a hot box or oven. In accordance with said application, the scrim, preferably with the carrier belt, is brought into contact with a heated arcuate release surface moving at substantially the same speed as the scrim and belt. The residence contact time between the scrim and the release surface is controlled together with the temperature to allow the scrim adhesive to reach its elastomeric point. This allows use of plastisols and latexes as the warp adhesive and produces scrims which are both stronger and have improved integrity. Further, the adhesive level can be reduced to about 65 to 70% or even less of that which was required when an oven is employed.

However, this method requires that the scrim make a clean separation with the release surface, i.e.—the separation must be carried out in such a fashion as to avoid any significant residue or adhesive buildup on the release surface. Such residue will rapidly buildup in a short period of time and require that the process be discontinued so that the release surface can be cleaned. The avoidance of adhesive buildup is magnified at high speeds since the residence time is sharply reduced. While the size of the arcuate surface, such as a roll, can theoretically be increased to provide longer contact times, there are practical problems associated with this solution. Rolls having a diameter of greater than about 8 feet are simply unavailable commercially, due to the inability to form such rolls that withstand the pressure required for the steam typically used as the heating media. Moreover, the use of larger rolls that are available tends to significantly affect the economics of scrim formations.

Certain adhesives operate with little difficulty under economical, commercial conditions, i.e.—scrim formation at speeds of 1300 to 1500 ft./min. or even more with residence times on the arcuate release surface of about 0.5 seconds or less. Other adhesives which could otherwise be desirably employed rapidly buildup on the release surface when used for scrim formation at such conditions.

It is accordingly an object of the present invention to provide a process for forming nonwoven scrim materials in an efficient manner at commercial speeds.

Another object provides a process for forming scrim materials which allows a wide selection of adhesives that may be advantageously utilized to form the scrim.

A further object of this invention lies in the provision of a process for forming nonwoven scrim materials which may be operated at high speeds with relatively little downtime because of the adhesive employed.

Other objects and advantages of the present invention will become apparent as the following description proceeds, taken in conjunction with the accompanying drawing, in which the sole figure illustrates an exemplary means of carrying out the process of the present invention.

While the invention is susceptible of various modifications and alternative forms, certain specific embodiments thereof have been shown by way of example in the drawing which will be described in detail herein. It should be understood, however, that it is not intended to limit the invention to the particular form disclosed, but, on the contrary, the intention is to cover all modifications, equivalents and alternatives falling within the spirit and scope of the invention.

Turning to the sole drawing, a scrim is first formed by using the crosslayer apparatus shown in the previously mentioned Hirschy patent. Thus, a series of machine direction or warp threads 10 are continuously supplied from a conventional creel (not shown) and run across an applicator roll 12. The applicator roll 12 has a series of V-grooves with rounded bottoms in which the threads are guided. The roll 12 runs in a pool of adhesive 14 so that the warp threads in the grooves are submerged in adhesive and are provided with a substantially continuous adhesive coating around the periphery of the threads.

In accordance with the present invention, the adhesive supplied contains a minor amount of a selected release agent which allows improved separation of the scrim from the arcuate release surface at commercial speeds by reducing adhesive buildup. The release agent selected is dependent upon the nature of the release surface and the type of adhesive. Employment of minor amounts of the selected release agent achieve the improved separation yet do not adversely affect to any significant degree the function of the adhesive in imparting strength to the scrim. The function of the release agent and the types that may be selected will be discussed in connection with the description of the curing of the adhesive on the release surface and the subsequent separation of the scrim from the surface.

The adhesively coated warp threads are then guided onto a heated crosslayer belt 16, advantageously having a surface formed of a material such as silicone rubber. The belt should be heated to a temperature high enough to increase the tack of adhesive so that subsequently positioned threads will adhere thereto. The spaced warp threads 10 may then be wrapped at helical angles across a stationary mandrel 18. A circular carrier 20 sets spaced fill threads 22 onto the adhesively coated warp threads in the form of helices at right angles to the helices formed by the warp threads. As the belt emerges from around the mandrel 18, a slitter 24 is provided to form a scrim of the desired width.

The scrim emerging from the crosslayer, in accordance with the hereinbefore identified Schwoerer application, is then separated from the cross layer belt by bringing the scrim and belt into contact with a heated arcuate release surface moving at substantially the same speed as the scrim and belt and then separating the scrim and belt from the surface and from each other after the elastomeric point of the adhesive has been reached. To this end, and as is shown in the sole figure, the formed scrim 25 and crosslayer belt 16 are partially wrapped around a rotating, internally heated roll 26, suitably provided with a release surface such as chrome, polytetrafluoroethylene or fluoroethylene-propylene copolymer resin with the scrim being in contact with the heated roll. If desired, impingement of a fluid such as air, as schematically indicated at 28, can be provided to serve as an additional source of adhesive curing.

With respect to the temperature of the arcuate release surface 26, the important requisite is that it be sufficient to allow the scrim adhesive to achieve its elastomeric point during its period of contact with the surface. Thus, the appropriate temperature of the release surface will depend on the scrim speed and the degree of wrap on the roll, as well as the characteristics of the adhesive itself. As used herein, the elastomeric point is that point at which the cohesive forces between the molecules of the adhesive resin become strong enough to result in film formation. With respect to latexes and solvent-based adhesives, the elastomeric point is reached when film formation results from the removal of the aqueous carrier or solvent. With respect to plastisols, the elastomeric point corresponds to plastisol fusion. Stated another way, the elastomeric point is that point at which the cohesive energy between the molecules of the adhesive resin are sufficiently greater than the adhesive energy to the surface from which the scrim is being separated that release can be effected therefrom without significant disruption of the scrim.

The temperature of the release surface 26 is generally maintained within the range of from about 200° F. to about 400° F. When a plastisol adhesive is employed, such as polyvinyl chloride, it has been found satisfactory to maintain the temperature in the range of from about 300° F. to about 400° F. A latex adhesive, such as vinyl acetates and ethylene-vinyl acetate copolymers, will require the use of temperatures somewhere near the middle of the range.

While a wide range of adhesives may be employed for scrim formation at commercial conditions (i.e.—speeds in the range of 1300–1500 ft./min. and residence times on the heated arcuate surface of about 0.5 seconds or less), some of the commercially available plastisol and latex adhesives do not function satisfactorily due to buildup on the release surface. In accordance with the present invention, incorporating a minor amount of oleic acid, dioctyl phthalate, a dispersed paraffin wax emulsion, a mineral oil or dispersed silicones into the adhesive improves the high speed scrim formation operation without adversely affecting to any appreciable extent the function of the adhesive.

The selection of the specific release agent should be coordinated with the type of adhesive used and the material forming the arcuate, heated surface. Thus, oleic acid, mineral oil and dioctyl phthalate may be used with chrome, polytetrafluoroethylene and fluoroethylene-propylene copolymer resins as the arcuate surface. The other listed release agents are desirably used only with polytetrafluoroethylene resin surfaces. Oleic acid may be used with both plastisol (e.g.—polyvinyl chloride) and latex adhesives whereas the other release agents of the present invention achieve improved results only with latex adhesives.

A representative example of a suitable mineral oil is "Cynol 760" (American Cyanamid), a fully refined mineral oil liquid having a specific gravity of 0.86 at 75° F. A suitable dispersed paraffin wax emulsion is "Nopcosize KOY" (Diamond Shamrock Chemical Company), which is a white emulsion, 30% solids and the wax having a melting point of 185° F. A representative example of a dispersed silicone is "Medical Antifoam C"—HH0456 (Dow Corning).

The release agent may be suitably incorporated into the adhesive by conventional blending, using any of the commercially available mixers, and should be present in an amount of from about 2 to about 10 parts per 100 parts of either the latex solids or the plastisol resin.

It should be appreciated that the extent of improvement provided by incorporating the release agent of the present invention will vary depending upon the process parameters involved such as residence time on the arcuate, heated surface, the material used for the arcuate surface, the type of adhesive and the particular release agent selected. The improvement thus varies from marginal to substantial.

In accordance with a particularly advantageous embodiment of this invention, substantial improvement can be achieved when the adhesive used is "ELVACE" ethylene-vinyl acetate copolymer (E. I. du Pont de Nemours). The use of this adhesive produces a strong scrim with an excellent aesthetic appearance at relatively low adhesive applications yet cannot be run at high speeds and residence times of less than about 0.5 seconds without the inclusion of a release agent according to the present invention.

Turning again to the drawing, after the adhesive has reached its elastomeric point, the thus-cured adhesive with the selected release agent allows the scrim and crosslayer belt to be separated from the roll 26 and each other at commercial speeds. As shown, the scrim-belt combination is first removed from the roll 26 over the take-off roll 34 and thereafter passed into contact with a rotating, chilled roll 32. Separation of the scrim and belt is achieved at the roll 30, and the belt is returned for further use in the process.

The passage of the scrim-belt combination in contact with the chilled roll prior to separation is particularly desirable since cooling hardens the adhesive, and, thus, makes separation of the scrim and belt easier. Such cooling however is not essential and separation can occur any time after the adhesive has reached its elastomeric point. For example, the belt can be separated from the scrim while the scrim is in contact with the roll 26 or simultaneous with its separation therefrom.

After separation from the belt, the scrim can be then combined, in accordance with any conventional method, to provide a wide variety of products. As shown in the exemplary embodiment, adhesive is supplied to the warp threads and fill threads, respectively, by applicator rolls 36 and 38. Two plies of cellulosic wadding 40 are then unwound from rolls 42 and are passed around guide roll 44 with the scrim being positioned between the wadding layers.

The scrim-reinforce laminate is then conventionally treated by passing the laminate 46 around a series of heated rolls 48 to activate the adhesive and then calendering as indicated at 50. The thus-formed product may then be wound up on roll 52 in accordance with conventional techniques.

The following example is intended to be merely illustrative, but not in limitation, of the present invention. Unless otherwise set forth, all parts are by weight.

Example

The scrim was made using apparatus generally the same as set forth in the accompanying figure. A nylon scrim was formed with three threads (40 denier) in the machine direction and 2½ (70 denier) in the cross direction, each per inch. The scrim was about 12 inches wide, and the roll 26 had a 30 inch diameter, was internally heated by steam, and had a "Teflon S" polytetrafluoroethylene resin (E. I. du Pont de Nemours) surface. The wrap of the scrim 25 and the belt 16 about the roll 26 was about 45°. The following ethylene-vinyl acetate adhesives were used:

A—"Borden's 9216"
B—"Elvace"

C–F—"Elvace" formulations having the properties set forth in Table 1:

TABLE 1

| Properties | Adhesive | | | |
|---|---|---|---|---|
| | C | D | E | F |
| Solids (percent by weight) | 49.6 | 49.6 | 49.2 | 50 |
| Viscosity (Brookfield—60 r.p.m. 25° C.) | 163 | 110 | 135 | 396 |
| pH | 4.5 | 4.1 | 4.0 | 5.2 |
| Particle charge | Anionic | Anionic | Anionic | Anionic |
| Cured film properties: | | | | |
| Modulus (p.s.i.) | 750 | 700 | 1,150 | 3,600 |
| Elongation (percent) | 425 | 750 | 650 | 675 |
| Tensile strength (p.s.i.) | 1,000 | 1,450 | 1,800 | 1,775 |

Scrim was formed in a number of runs using the various adhesives identified herein with varying materials incorporated as release agents and at several speeds of formation. Additional parameters are shown in Table 2:

TABLE 2

| Run number | Adhesive identification | Adhesive amt. (gm./yd.²) | Steam pressure roll 26 (p.s.i.) | Temperature roll 26 (° F.) |
|---|---|---|---|---|
| 1 | A | 1.3 | 55 | 285 |
| 2 | B | 1.2 | 100 | 340 |
| 3 | B | 1.2 | 100 | 340 |
| 4 | B | 1.2 | 100 | 340 |
| 5 | B | 1.2 | 100 | 340 |
| 6 | C | 1.2 | 100 | 340 |
| 7 | C | 1.2 | 100 | 340 |
| 8 | C | 1.2 | 100 | 340 |
| 9 | C | 1.2 | 100 | 340 |
| 10 | A/C (50/50) | 1.2 | 100 | 340 |
| 11 | C | 1.2 | 100 | 340 |
| 12 | D | 1.25 | 100 | 340 |
| 13 | D | 1.25 | 100 | 340 |
| 14 | E | 1.35 | 100 | 340 |
| 15 | F | 1.30 | 100 | 340 |
| 16 | F | 1.30 | 100 | 340 |
| 17 | F | 1.30 | 100 | 340 |
| 18 | C | 1.15 | 100 | 340 |
| 19 | C | 1.15 | 100 | 340 |
| 20 | E | 1.25 | 100 | 338 |
| 21 | E | 1.25 | 100 | 338 |
| 22 | E | 1.25 | 100 | 338 |
| 23 | E | 1.25 | 100 | 338 |

The surface buildup on the roll 26 was observed and rated, using an arbitrary 1 (best) to 4 scale wherein: 1—none or excellent, 2—slight or good, 3—medium or fair, 4—bad. The results are set forth in Table 3, as are the adhesive additives and amounts:

TABLE 3

| Run No. | Additive and amount | Surface buildup | | | |
|---|---|---|---|---|---|
| | | 100 ft./min. | 180 ft./min. | 260 ft./min. | 300 ft./min. |
| 1 | None | 1 | 1 | 1 | 1 |
| 2 | do | 1 | 2 | 3 | 4 |
| 3 | Paraffin wax ("Nopcosize KOY")—8 parts.[1] | 1 | 1 | 2–3 | 4 |
| 4 | Oleic acid–3.3 | 1 | 1 | 2–3 | 4 |
| 5 | Mineral oil ("Cynol 760")—3.3 | 1 | 1 | 2–3 | 4 |
| 6 | None | 2–3 | 4 | Inop. | Inop. |
| 7 | Paraffin wax—8 | 1 | 4 | Inop. | Inop. |
| 8 | Oleic—3.3 | 2 | 4 | Inop. | Inop. |
| 9 | Dispersed silicone (Dow Corning's "Medical Antifoam")—3.3 | 1 | 2–3 | 4 | Inop. |
| 10 | None | 1 | 4 | Inop. | Inop. |
| 11 | Mineral oil—2 | 1–2 | 4 | Inop. | Inop. |
| 12 | None | 1+ | 2 | 3 | 3+ |
| 13 | Paraffin wax—6 | 1+ | 2 | 2+ | 2+ |
| 14 | None | 1+ | 2+ | 3+ | 4 |
| 15 | do | 1 | 2+ | 3 | 4 |
| 16 | Oleic acid—3.3 | 1 | 1 | 1 | 1+ |
| 17 | CaCO₃—8 | 1 | 2 | 2+ | 4 |
| 18 | None | 2 | 3 | 4 | Inop. |
| 19 | Paraffin wax—6 | 1+ | 3 | 4 | Inop. |
| 20 | Mineral oil—3.3 | 1 | 1 | 1+ | 2 |
| 21 | Dispersed silicones—3.3 | 1 | 1 | 2 | 4 |
| 22 | Oleic acid—3.3 | 1 | 1 | 1+ | 1+ |
| 23 | Dioctyl phthalate—3.6 | 1 | 1+ | 1–2 | 2 |

[1] Parts by weight per 100 parts of latex solids content of adhesive for this and all further additive amounts in this table.

The buildup of adhesive on belt 16 was also observed and rated, the buildup problem typically being less severe than in connection with the heated, arcuate surface.

Thus, as has been seen, the present invention provides an efficient process for forming nonwoven scrims at commerical speeds. By incorporating a minor amount of a selected release agent into the adhesive used to form the scrim in accordance with this invention, the adhesive may be cured by passing in contact with a heated, rotating arcuate, release surface and the formed scrim then readily separated from the release surface without significant adhesive buildup. The incorporation of the selected release agent into the scrim adhesive allows the employment of adhesives which could not otherwise be used to form scrims at commercial speeds. As the runs of the Example demonstrate, the degree of improvement achieved depends upon the adhesive employed and ranges from marginal to substantial, allowing operation where this could not be otherwise achieved.

What is claimed:

1. In a process for forming a nonwoven scrim which comprises forwarding a first set of longitudinally moving laterally spaced threads, coating the threads with an adhesive selected from the group consisting of latexes and plastisols, increasing the level of tack in the adhesive to a level sufficient to allow threads to adhere thereto, positioning a second set of spaced threads on, and extending transversely to, the first set to form a nonwoven scrim, passing the scrim around and in contact with an arcuate release surface heated to a temperature sufficient to allow the adhesive to reach its elastomeric point and moving at a speed substantially the same as the scrim and separating the scrim from the arcuate surface after the adhesive has reached its elastomeric point, the improvement comprising adding to said adhesive a release agent selected from the group consisting of mineral oil, a paraffin wax, oleic acid, silicones and dioctyl phthalate in an amount sufficient to allow separation of the nonwoven scrim from said arcuate release surface with the absence of any significant adhesive buildup on the surface, with the proviso that when the adhesive is a plastisol, the release agent is oleic acid.

2. The process of claim 1 wherein the release agent is oleic acid.

3. The process of claim 1 wherein the release agent is mineral oil.

4. The process of claim 1 wherein the release agent is paraffin wax.

5. The process of claim 1 wherein the release agent is dioctyl phthalate.

6. In a process for forming a nonwoven scrim which comprises forwarding a first set of longitudinally moving laterally spaced threads, coating the threads with an adhesive selected from the group consisting of latexes and plastisols, depositing the adhesively coated threads onto a carrier heated to a temperature sufficient to increase the tack of the adhesive to a level sufficient to allow threads to adhere thereto, positioning a second set of spaced threads on, and extending transversely to, the adhesively coated first set to form a nonwoven scrim, passing the carrier and scrim around an arcuate, release surface heated to a temperature sufficient to allow the adhesive to reach its elastomeric point and moving at a speed substantially the same as the scrim and carrier, the scrim being in contact with the heated surface, separating the scrim and carrier from the arcuate surface after the adhesive has reached its elastomeric point with the contact time being up to about 0.5 seconds and thereafter separating the scrim and carrier, the improvement comprising adding to said adhesive a release agent selected from the group consisting of mineral oil, a paraffin wax, oleic acid, silicones and dioctyl phthalate in an amount sufficient to allow separation of the nonwoven scrim and carrier from said arcuate release surface with the absence of any significant adhesive buildup on the surface, with the proviso that when the adhesive is a plastisol, the release agent is oleic acid.

References Cited

UNITED STATES PATENTS

| 3,025,196 | 3/1962 | Burger | 156—426 |
| 3,307,992 | 3/1967 | Condon et al. | 156—426 |
| 3,549,455 | 12/1970 | Armstrong | 156—441 |
| 3,539,673 | 11/1970 | Poole | 264—300 |
| 3,686,050 | 8/1972 | Rubin et al. | 156—174 |
| 3,442,740 | 5/1969 | David | 156—181 |
| 3,146,142 | 8/1964 | Maly | 156—289 |
| 3,066,999 | 12/1962 | Nakajo | 264—300 |
| 2,353,000 | 7/1944 | Austin et al. | 264—300 |
| 2,897,176 | 7/1959 | Rocky et al. | 264—300 |
| 2,722,038 | 11/1955 | Freund | 264—300 |

D. J. FRITSCH, Primary Examiner

U.S. Cl. X.R.

156—289, 296, 426, 431, 499